United States Patent
Gupta et al.

(10) Patent No.: US 9,652,301 B2
(45) Date of Patent: May 16, 2017

(54) SYSTEM AND METHOD PROVIDING RUN-TIME PARALLELIZATION OF COMPUTER SOFTWARE USING DATA ASSOCIATED TOKENS

(75) Inventors: Gagan Gupta, Fitchburg, WI (US); Gurindar S. Sohi, Madison, WI (US); Srinath Sridharan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1122 days.

(21) Appl. No.: 12/882,892

(22) Filed: Sep. 15, 2010

(65) Prior Publication Data

US 2012/0066690 A1 Mar. 15, 2012

(51) Int. Cl.
   *G06F 9/46* (2006.01)
   *G06F 9/50* (2006.01)
   *G06F 9/52* (2006.01)
   *G06F 9/45* (2006.01)

(52) U.S. Cl.
   CPC ........... *G06F 9/526* (2013.01); *G06F 8/45* (2013.01); *G06F 9/46* (2013.01); *G06F 9/50* (2013.01)

(58) Field of Classification Search
   CPC .......... G06F 9/466; G06F 9/467; G06F 8/433; G06F 17/30362
   See application file for complete search history.

(56) References Cited

U.S. PATENT DOCUMENTS

| | | | |
|---|---|---|---|
| 6,029,190 A * | 2/2000 | Oliver | 718/107 |
| 6,823,511 B1 * | 11/2004 | McKenney et al. | 718/102 |
| 8,539,486 B2 * | 9/2013 | Cain et al. | 718/100 |
| 2003/0079094 A1 * | 4/2003 | Rajwar et al. | 711/150 |
| 2004/0088573 A1 * | 5/2004 | Jeyaram | G06F 9/52 713/167 |
| 2006/0123423 A1 | 6/2006 | Brenner | |
| 2007/0067774 A1 * | 3/2007 | Kukanov et al. | 718/102 |
| 2008/0016294 A1 * | 1/2008 | Hillier et al. | 711/155 |
| 2008/0244588 A1 * | 10/2008 | Leiserson et al. | 718/102 |
| 2008/0256074 A1 * | 10/2008 | Lev et al. | 707/8 |
| 2010/0070740 A1 * | 3/2010 | Allen et al. | 712/30 |

OTHER PUBLICATIONS

Bobba "Hardware support for efficient transactional and supervised memory system", university of Wisconsin—Madison, Feb. 24, 2010, pp. 1-133.*

(Continued)

*Primary Examiner* — Meng An
*Assistant Examiner* — Caroline H Arcos
(74) *Attorney, Agent, or Firm* — Boyle Fredrickson, S.C.

(57) ABSTRACT

A system and method of parallelizing programs assigns write tokens and read tokens to data objects accessed by computational operations. During run time, the write sets and read sets for computational operations are resolved and the computational operations executed only after they have obtained the necessary tokens for data objects corresponding to the resolved write and read sets. A data object may have unlimited read tokens but only a single write token and the write token may be released only if no read tokens are outstanding. Data objects provide a wait list which serves as an ordered queue for computational operations waiting for tokens.

10 Claims, 7 Drawing Sheets

(56) References Cited

OTHER PUBLICATIONS

Allen, Matthew D., et al., Serialization Sets: A Dynamic Dependence-Based Parallel Execution Model, Technical Report #1644, Aug. 2008, pp. 1-10, Computer Sciences Department, University of Wisconsin-Madison, Madison, Wisconsin, USA.
Allen, Matthew D., et al., Metadata-Based Parallelization of Program, Aug. 10, 2007, Computer Sciences Department, University of Wisconsin-Madison, Madison, Wisconsin, USA.
Rinard, Martin C. The Design, Implementation and Evaluation of Jade: A Portable, Implicitly Parallel Programming Language, A Disseration Submitted to The Department of Computer Science and The Committee on Graduate Studies of Stanford University in Partial Fulfillment of the Requirements for the Degree of Doctor of Philosophy, Sep. 1994, Palo, Alto, CA, USA.
De Poerck, Stephanie, PCT International Search Report, dated Nov. 28, 2011, European Patent Office, HV Rijswijk, The Netherlands.
Mohindra, A., et al., Distributed Token Management in Calypso File System, pp. 290-297, ,Proceedings of Sixth IEEE Symposium on Parallel and Distributed Processing, Oct. 26-29, 1994, IEEE, Los Alamitos, CA, USA.
Guedes, P., et al., Distributed Shared Object Memory, pp. 142-149, Oct. 14, 1993, Proceedings of Fourth Workshop on Workstation Operating Systems, IEEE, Los Alamitos, CA, USA.
Pochayevets, Oleksandr, BMDFM: A Hybrid Dataflow Runtime Parallelization Environment for Shared Memory Multiprocessors, Thesis in Computer Engineering, Technische Universitat Munchen, Institut fur Informatik, Lehrstuhl fur Rechnertcehcnik und Rechneroganisation, pp. 1-170, Published 2006, Munich, Germany.

* cited by examiner

SYSTEM AND METHOD PROVIDING RUN-TIME PARALLELIZATION OF COMPUTER SOFTWARE USING DATA ASSOCIATED TOKENS

STATEMENT REGARDING FEDERALLY SPONSORED RESEARCH OR DEVELOPMENT

This invention was made with United States government support under grant number 0702313 awarded by the National Science Foundation. The United States government has certain rights in the invention.

CROSS REFERENCE TO RELATED APPLICATION

Background

The present invention relates to the implementation and execution of programs in parallel on multiple processors and in particular to a software system providing parallelization of programs.

Improvements in software performance have been realized primarily through the use of improved processor designs. Such performance improvements have the advantage of being completely transparent to the program generator (for example, a human programmer, compiler, or other program translator). However, achieving these benefits depends on the continuing availability of improved processors.

Parallelization offers another avenue for software performance improvement by dividing the execution of a software program into multiple components that can run simultaneously on a multi-processor computer. As more performance is required, more processors may be added to the system, ideally resulting in attendant performance improvement. However, generating parallel software is very difficult and costly. Accordingly, parallelization has traditionally been relegated to niche markets that can justify its costs.

Recently, technological forces have limited further performance improvements that can be efficiently realized for individual processors. For this reason, computer manufacturers have turned to designing processors composed of multiple cores, each core comprising circuitry (e.g., a CPU) necessary to independently perform arithmetic and logical operations. In many cases, the cores also support multiple execution contexts, allowing more than one program to run simultaneously on a single core (these cores are often referred to as multi-threaded cores and should not be confused with the software programming technique of multi-threading). A core is typically associated with a cache and an interconnection network allowing the sharing of common memory among the cores; however, other "shared memory" architectures may be used, for example those providing exclusive memories for each processor with a communication structure. These multi-core processors often implement a multi-processor on a single chip. Due to the shift toward multi-core processors, parallelization is supplanting improved single processor performance as the primary method for improving software performance.

Improved execution speed of a program using a multi-processor computer depends on the ability to divide a program into portions that may be executed in parallel on the different processors. Parallel execution in this context requires identifying portions of the program that are independent such that they do not simultaneously operate on the same data. Of principal concern are portions of the program that may write to the same data, "write-write" dependency, and portions of the program that may implement a reading of data subsequent to a writing of that data, "read-write" dependency, or a writing of data subsequent to a reading of the data, "write-read" dependency. Errors can result if any of these reads and writes change in order as a result of parallel execution. While parallel applications are already common for certain domains, such as servers and scientific computation, the advent of multi-core processors increases the need for many more types of software to implement parallel execution to realize increased performance.

Many current programs are written using a sequential programming model, expressed as a series of steps operating on data. This model provides a simple, intuitive programming interface because, at each step, the generator of the program (for example, the programmer, compiler, and/or some other form of translator) can assume the previous steps have been completed and the results are available for use. However, the implicit dependence between each step obscures possible independence among instructions needed for parallel execution. To statically parallelize a program written using the sequential programming model, the program generator must analyze all possible inputs to different portions of the program to establish their independence. Such automatic static parallelization works for programs which operate on regularly structured data, but has proven difficult for general programs. In addition, such static analysis cannot identify opportunities for parallelization that can be determined only at the time of execution when the data being read from or written to can be positively identified.

U.S. patent application Ser. No. 12/543,354 filed Aug. 18, 2009 (the "Serialization" patent) assigned to the same assignee as the present invention and hereby incorporated by reference, describes a system for parallelizing programs, written using a sequential program model, during an execution of that program. In this invention, "serializers" are associated with groups of instructions ("computational operations") to be executed before execution of their associated computational operations. The serializers may thus positively identify the data accessed by the computational operation to assign the computational operation to a particular processing queue. Computational operations operating on the same data are assigned to the same queue to preserve their serial execution order. Computational operations operating on disjoint data may be assigned to different queues for parallel execution. By performing the parallelization during execution of the program, many additional opportunities for parallelization may be exploited beyond those which may be identified statically.

This serialization method may also be used where the data sets of computational operations are not completely disjoint through the use of a "call" instruction which collapses parallel execution when a data dependency may exist, causing the program to revert to conventional serial execution. This approach slows executions of concurrent parallel instruction groups and limits the discovery of potential parallelism downstream from the "call" instruction while the "call" is in force.

BRIEF SUMMARY

The present invention flexibly accommodates computational operations that access overlapping data sets through the use of tokens (in one embodiment read and write tokens) assigned to each data set. Computational operations only execute when they have obtained the necessary tokens, whose availability indicates that there are no unresolved data dependencies. A wait list for computational operations that cannot obtain tokens, logically separate from the processor queues (the latter which hold computational operations ready for execution), enforces the proper execution order of waiting computational operations to avoid data dependency problems. By using a token wait list instead of the processor queues, pending computational operations are no longer locked to a given processor in order to ensure proper execution order. This permits the present invention to improve work scheduling by allowing processors to steal work from other processor's queues when a processor is idle.

Specifically, the present invention provides a method of executing a program having computational operations accessing data in parallel using multiple processors. In this method, data elements are identified to unique write tokens. Contemporaneously with execution of a computational operation writing to the data element, a check is made to see if the write token is available. If the write token is available, the write token is taken, and the computational operation scheduled to be executed on a processor. On the other hand, if the write token is not available the computational operation is "shelved" without execution on a processor until the write token again becomes available. Upon completion of execution of the computational operation, the write token is again made available.

It is thus a feature of at least one embodiment of the invention to provide a system that can exploit run-time opportunities for parallelism, providing a simple mechanism for detecting write-write and write-read data dependencies. The use of a write token simply and clearly indicates whether there are pending, preceding instructions writing to or reading the same data.

One embodiment of the invention may further include the step of identifying a data element with a plurality of read tokens and contemporaneously with execution of a computational operation reading the data element, taking a read token and upon completion of the computational operation returning the read token.

It is thus a feature of at least one embodiment of the invention to provide a simple mechanism for detection of read-write data dependencies that can use the same token structure.

The read tokens may be represented by a tally that may be incremented and decremented to indicate a taking or return of read tokens.

It is thus a feature of at least one embodiment of the invention to permit an arbitrarily large number of read tokens to be simply distributed and tracked.

The write token may be only available if the tally indicates that no read tokens are currently taken.

It is thus a feature of at least one embodiment of the invention to provide an integrated mechanism for handling both write-dependencies and read-dependencies.

When a computational operation is "shelved" (waiting for either a write token or a read token) it may be enrolled in a wait list associated with the data element and when another computational operation releases the necessary token, the completing computational operation may provide the appropriate token to the next computational operation in the wait list to release that next computational operation for processing. When the next computational operation in the wait list is waiting for a write token, only that next computational operation is released by the completing computational operation. In distinction, when the next computational operation in the wait list is waiting for a read token, that computational operation and all succeeding computational operations in the wait list waiting for read tokens may also be released up to the first computational operation waiting for a write token.

It is thus a feature of at least one embodiment of the invention to provide a queue-like structure that does not tie a particular computational operation to a particular processor thereby permitting better use of processor resources. It is a further feature of at least one embodiment of the invention to reduce the number of computational operations waiting for read tokens.

On the other hand, each processor may be associated with a processor queue and a computational operation may be scheduled to execute by placing it on a processor queue.

It is thus a feature of at least one embodiment of the invention to maximize utilization of processors by queuing computational instructions.

Processors may take computational operations from the queues of other processors when they are not executing computational operations.

It is thus a feature of at least one embodiment of the invention to provide an ordering mechanism that respects data dependencies but that permits flexible reallocation of computational operations among processors for maximum computational efficiency. This may be accomplished by ordering computational operations in the wait list rather than in processor queues associated with the processors.

The step of checking for the write and/or read token may be provided by instructions embedded in the program and the step of releasing the write and/or read token may be provided by instructions attached to queued computational operations.

It is thus a feature of at least one embodiment of the invention to permit the computational overhead of the parallelization method to be distributed among processors executing the computational operations and executed like computational operations.

The tokens may be realized by change of a variable value.

It is thus a feature of at least one embodiment of the invention to provide for extremely flexible implementation of the tokens by a variety of different techniques.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DETAILED DESCRIPTION

Figure 1:
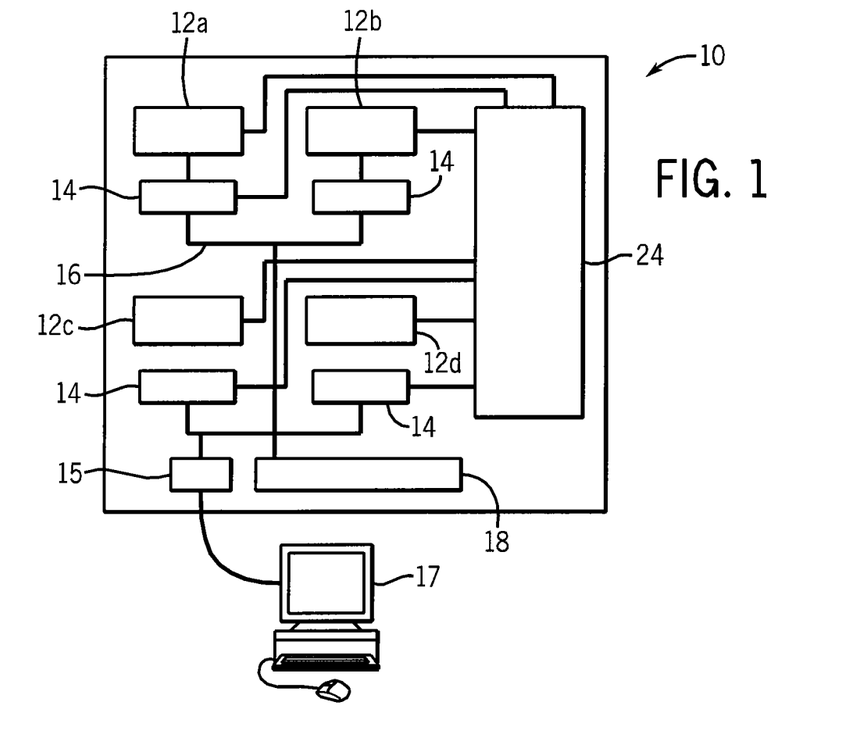
FIG. 1 is a simplified representation of the physical architecture of an example multi-processor system having four processors and being one type of multi-processor system suitable for implementation of the present application.

Referring now to FIG. 1, a multi-processor system 10 may include, for example, four processors 12a-12d each associated with a local memory 14 and communicating on an interconnection network structure 16 with shared memory 18. It will be understood that the present application applies to cases where the local memory 14 and shared memory 18 are managed automatically by hardware (i.e., local memory 14 is a cache), as well as cases where software must explicitly perform transfers among shared memory 18 and local memories 14. It will be further understood that shared memory 18 may in turn communicate with additional external memory (not shown) or in fact may be comprised totally of local memories 14 accessed through communication protocols. Each of the processors 12 may also communicate with common control circuitry 24 providing coordination of the processors 12, and may communicate through a port 15 with an external computer workstation 17 for programming, compiling or the like, as is understood in the art.

Although the present application is described with respect to a multi-processor implemented as separate processors communicating with shared memory, it will be understood that the term multi-processor includes any type of computer system providing multiple execution contexts, including, but not limited to, systems composed of multi-threaded processors, multi-core processors, heterogeneous computational units, or any combination thereof.

Figure 2:
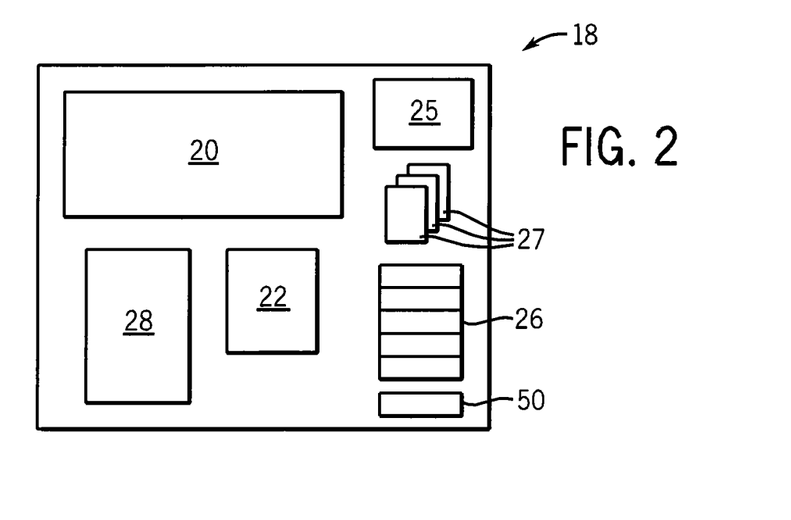
FIG. 2 is a simplified representation of the software elements of the present invention including a modified sequential model program for parallelization, associated libraries, data objects, and queue structures.

Referring now to FIG. 2, the shared memory 18 may hold a target program 20 to be parallelized, modified according to the present invention as will be described, and program data 22 accessed via the target program 20 during execution. Generally the target program 20 will be generated using a sequential programming model, meaning that all or part of the program was generated as if it would be executed on a single processor or as a single thread.

Shared memory 18 may further include runtime library 25 possibly providing class specifications (i.e., object prototypes), generators for data objects 27 (to be described) and ordered communication structures (e.g., processor queues 26), and code to implement the run-time data set identifiers and addendum routines described in further detail herein below. The shared memory 18 may also include processor queues 26 associated with the processors 12 and a memory "shelf" as will be described below. It is contemplated that the memory 18 will also support an operating system 28 providing execution context for the above as will generally be understood in the art.

Figure 3:
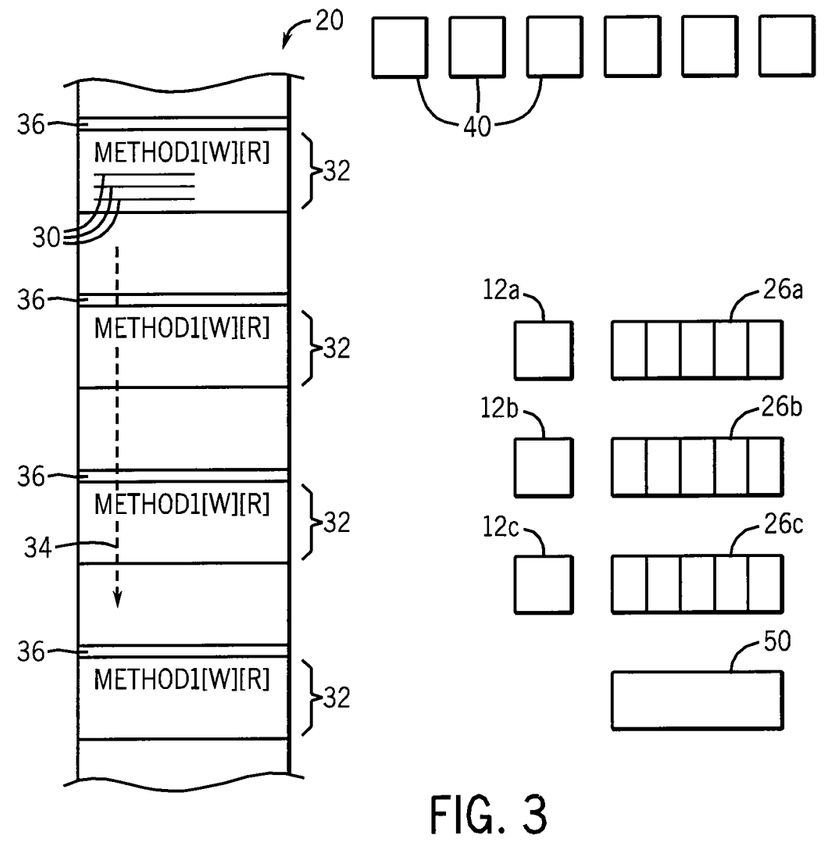
FIG. 3 is a logical diagram of the modified sequential model program of FIG. 2 showing computational operations comprised of groups of instructions labeled by the program generator (a human or possibly a software pre-processor) and associated with a data set identifier routine used in identifying read and write sets at run-time, also showing data objects holding read and write tokens, and processors and associated queues.

Referring now to FIG. 3, the target program 20 may comprise multiple computer executable instructions 30 (for examples instructions of the C++ programming language) collected in computational operations 32 designated in the figure as "methods". Generally, the target program 20 may comprise of different methods or multiple invocations of the same method as is shown in the figure. A computational operation 32, for example, may be a function, a subroutine, an object method, or other natural logical division of the target program 20.

Generally, a computational operation 32 will access data held in the shared memory 18 by reading or writing data from or to the shared memory 18. As depicted, each computational operation 32 may be designated with a unique title (e.g. method1) identifying the function of the computational operation 32 associated with a write set [W] and read set [R] indicating the data written to and read by the method (hence its argument(s) and value(s)). Thus, the designation "method1 [w] [r]" may represent a first computational operation 32 reading data [r] and writing to data [w]. It will be understood that the particular data of the write set and read set will typically be designated by a variable whose value may not be resolved at the time of program generation but determined only when the program is running. For this reason, the actual addresses of the read set and write set will frequently not be known by the program generator.

A given computational operation 32 (e.g. method1) of the target program 20 may be executed multiple times in different instances (either as part of different instantiated objects or repeated calls to a given function) and each different instance may have a different read set and write set dynamically determined during the execution of the target program 20. When the target program 20 is properly executed, these different instances execute in a serial execution order 34 representing the manner in which the target program 20 would execute, for example, on a single processor without data dependency conflicts. The serial execution order 34 is generally resolved only during execution of the target program 20 after flow control instructions in the serial model target program 20 are evaluated using actual data. The serial execution order 34 will generally differ from the static program order, for example, expressed in the source code of the target program 20 and will include dynamically determined loops, jumps and branches. In summary, the serial execution order 34 is the order in which the serial model target program 20 would execute without the parallelization of the present invention and in which all dependencies between instructions are properly resolved by the order of instruction execution.

Referring still to FIG. 3, the program generator, which maybe the programmer or a software pre-processor, may designate opportunities for parallelization by marking these computational operations 32 with a tag that both indicates the potential for parallelization and the extent of the computational operation. An example of such marking might be as follows:

database.static_xact_delegate (write_set1, read-set_1, db_xact)

where the computational operation 32 is of a type db_xact operating on data contained in a write_set1 and read-set_1 of database.

This marking invokes for each computational operation 32 a run-time, data object mapper 36 associated with the computational operation 32. For clarity, the data object mapper 36 is shown here as placed in-line in the serial execution order 34 in the target program 20 but in practice is only logically so positioned.

Generally, before execution of the computational operations 32 according to the serial execution order 34, the run-time data object mapper 36 will determine the write set and read set for the computational operation 32, most simply by examining the variable values designating the data to be written to or read from. The data object mapper 36 maps the resolved read set and write set to one or more data objects 40 each associated with individual or collections of program data 22 (shown in FIG. 2).

Generally, the data objects 40 define sets of program data 22, for example, as ranges of addresses, an object instantiation number, or set of records in a database. The mapping process may then be as simple as determining the address or record number of the data of the write or read sets of the computational operation 32 or the instance number of the object associated with a given method forming the computational operation 32 which is then mapped to the particular data object 40 having a comparable address range, record number range, or instantiation number.

The data objects 40 ideally define data sets that are "disjoint", meaning that they are accessed by one or a few computational operations 32 at one time. This definition of data objects 40 must balance a goal of collecting program data 22 into as large of sets as possible (coarse granularity) to minimize the number of data objects 40 required and the computational burden of the parallelizing operation, and in subdividing the data 22 as much as possible (fine granularity) to increase the possibilities of parallelization because the data objects are disjoint. This division may be informed by an understanding of the application by the programmer or may be done automatically by pre-processing of the program by a compiler or the like and may be redefined heuristically during program execution.

An example definition of data objects 40 for a banking database may divide the data of the database into data objects commensurate with the records of a single individual, reflecting an understanding that computational operations on one individual's records tend to be independent of operations on another individual's records.

Figure 4:
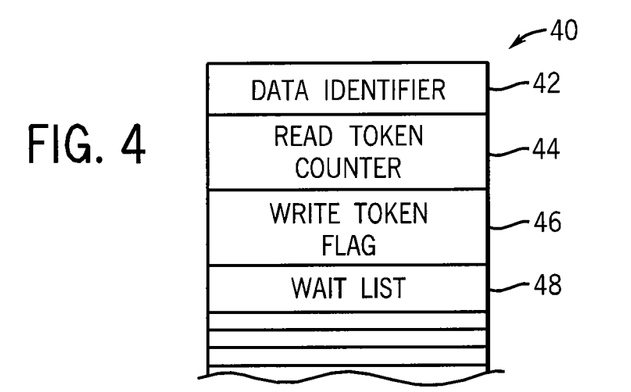
FIG. 4 is a detailed representation of a data object of FIG. 3.

Referring momentarily to FIG. 4, each of the data objects 40 may generally provide for identification data 42 pointing to the data it represents, for example, an address range or the like. In addition, the data object 40 may provide a read token counter 44 that may be incremented when a read token is granted and decremented when that read token is returned. The use of the counter permits an essentially unbounded number of read tokens to be granted while still tracking the total number of tokens outstanding with the expressed counter tally. A value of zero therefore indicates that all tokens have been returned. It will be appreciated that incrementing may alternatively be used to indicate the read token is returned and decrementing that the read token is taken and that this convention is arbitrary The data object 40 may also include a write token flag 46 reflecting the fact that each data object 40 has only a single write token and thus a counter is not required.

It will be appreciated that the read token counter 44 and the write token flag 46 may be implemented through a variety of structures including, for example, a single counter which may have a value of 0 when the write token has been taken, 1 when the write token is present and greater than 1 when read tokens have been taken, the number of granted tokens being the counter value minus one.

Finally, the data object 40 may include a wait list 48 which provides an ordered queue (according to a time at which a token is requested) of computational operations 32 requesting the tokens (read or write) which could not be provided to the computational operations 32 because the token is already taken. The wait list 48 may be any ordered communication structure such as a list or queue or the like.

Referring again to FIG. 2, ultimately, as will be described further below, each computational operation 32 is enrolled in one processor queue 26 associated with a given processor 12 which will execute the computational operations 32 so enrolled. When a computational operation 32 cannot be executed because the tokens it requires are not yet available, it may be placed on a shelf 50. It will be understood that the actual computational operation 32 need not be placed in the processor queue 26 or on the shelf 50, but this description refers to a logical location only. The processor queue 26 and shelf 50 may hold pointers or other identifying data. Generally, the processor queues 26 are general ordered communication structures that act logically as queues but may be any particular physical structure. Likewise, the shelf 50 may be any physical structure logically allowing temporary retention of computational operations as described.

Figure 5:
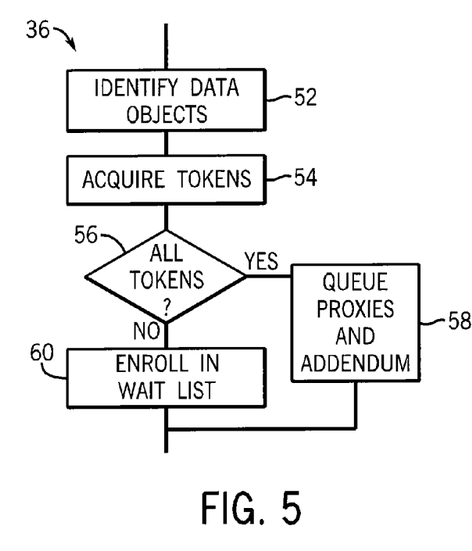
FIG. 5 is a flow chart of the data set identifier routine inserted into the program of FIG. 3 for identifying data sets at run time and obtaining necessary tokens.

Referring now to FIG. 5, the data object mapper 36 may operate not only to identify the necessary data objects 40 from which tokens must be obtained but may also provide instructions to manage enrolling computational operations 32 in the queues 26 or placing computational operations 32 on a shelf 50.

As described above, each data object mapper 36, as indicated by process block 52, initially operates to identify the data objects 40 associated with data accessed by a given computational operation 32 either to write to or read from that data. At process block 54, based on the identification at process block 52, the data object mapper 36 attempts to acquire the necessary tokens from the data objects 40. Generally, the acquisition of tokens, in one embodiment of the invention, follows the following rules:

(a) a write token may be granted only if it is available (not checked out by another computational operation 32 and there are no read tokens checked out, that is, the read token counter equals zero and the write token flag is set to "yes"); and (b) a read token may be granted only if the write token is available (that is, the write token flag is set to "yes").

These rules prevent write-write dependency conflicts because writing must occur in the order of write token requests, and prevent write-read dependency problems because the write token is not granted if there are pending reads, and prevent read-write dependency problems because the read token may not be granted if there is a pending write operation.

If, at decision block 56, all the tokens for the computational operation 32 associated with the data object mapper 36 are obtainable, then at process block 58 the computational operation 32 is enrolled in a processor queue 26 for any available processor 12 together with an addendum program 66 as will be described.

If, on the other hand, all the tokens cannot be obtained for the computational operation 32 associated with the data object mapper 36, then those tokens which can be obtained may be obtained and then the data object mapper 36 places the computational operation 32, per process block 60, on the a shelf 50 after the identity of the computational operation 32 is enrolled in the wait list 48 of all data objects 40 whose tokens were needed but not obtained.

As will be understood from the following description, the wait list 48 provides a queue function separate from the actual queues 26 that permits processors 12 to steal computational operations from other processors without upsetting the order structure enforced by the wait list 48.

Figure 6:
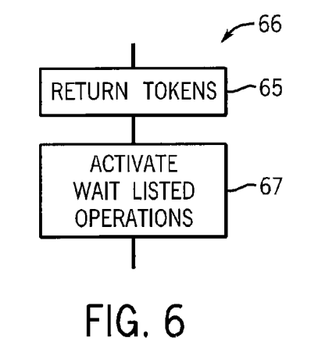
FIG. 6 is a flow chart of a token return routine inserted into a computational operation proxy when it is in queue.

Referring to FIG. 6, the addendum program 66 that will be added to the computational operation 32 when it is enrolled in a processor queue 26 (per process block 58 of FIG. 5) provides for the return of tokens at process block 65 after execution of the computational operation 32 by a processor 12. The addendum program 66 may further provide an activation of computational operations 32 that are at the top of the wait list 48, and that have been shelved per process block 67. The return of tokens per block 66 may imply that a shelved computational operation now has all the read and write tokens needed for execution, whether provided as a result of the actions at block 66 or otherwise.

An example of the operation of the present invention will now be described with respect to FIG. 7 in which six data objects 40 are provided, designated A-F. Initially, the read token counter 44 for each data object 40 is at zero (RT=0) indicating that no read tokens have been checked out and the write tokens for each data object 40 are at yes (WT=Y) indicating that the write tokens are available.

Figure 7:
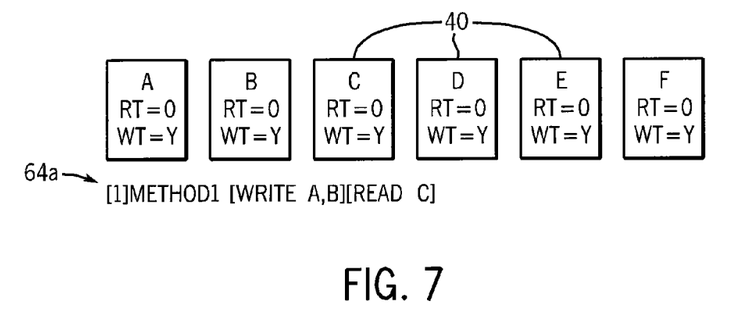
FIG. 7 is a diagram showing a state of the data objects upon receipt of a first computational operation.

As shown in FIG. 7, a first computational operation 32 may be processed by the run-time data object mapper 36 and given a unique identification here designated by [1]. The run-time data object mapper 36, reviewing the resolution of the argument and value variables designating the write set and read set for the computational operation 32 at the time of its execution in the serial execution order 34, maps the write set to data objects A and B and the read set to data object C. This mapping is designated in FIG. 7 by the text representation: [1]method1 [write: A, B] [read: C] where:

[1] is the method instance identifier, method1 is the method type,

A and B are the identifications of the data objects 40 representing data written to by the method, and C is the data object representing data read from by the method.

Figure 8:
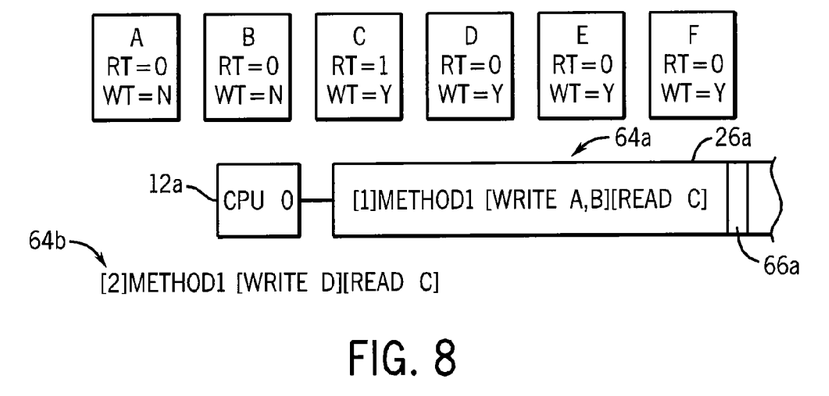
FIG. 8 is a figure similar to that of FIG. 7 showing the state of data objects and of processors and queues upon receipt of a second computational operation.

Referring now to FIG. 8, based on this mapping, the run-time data object mapper 36 obtains the necessary write tokens A and B from the A and B data objects 40 representing this data (converting the write token flags 46 to WT=N as shown) and takes a read token from the C data object 40 (incrementing the read token counter to RT=1) and enrolls a proxy operation 64a for this computational operation 32 into the processor queue 26a together with addendum operation 66 for the execution portion of process block 58 in FIG. 5 as discussed above.

Figure 9:
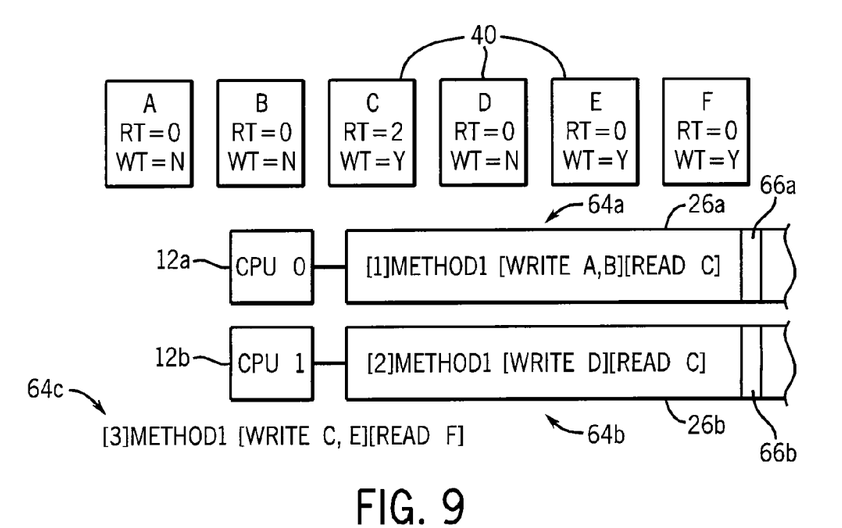
FIG. 9 is a figure similar to that of FIGS. 7 and 8 showing the state of the data objects, processors, and queues upon receipt of a third computational operation exhibiting data dependency.

Referring still to FIG. 8, a run-time data object mapper 36 for a second computational operation [2]method1[write: D] [read: C] may then be executed representing a different instance of the previous method (or alternatively may be an entirely disparate method). Referring to FIG. 9, this run-time data object mapper 36, as before, obtains the necessary write token D from the D data object 40 and takes a read token from the C data object 40 (incrementing the read token counter to RT=2) and enrolls a proxy operation 64b for this computational operation 32 into the processor queue 26b together with addendum operation 66. Multiple read tokens are available for each data object 40 and so there are no data dependency issues raised at this time.

Figure 10:
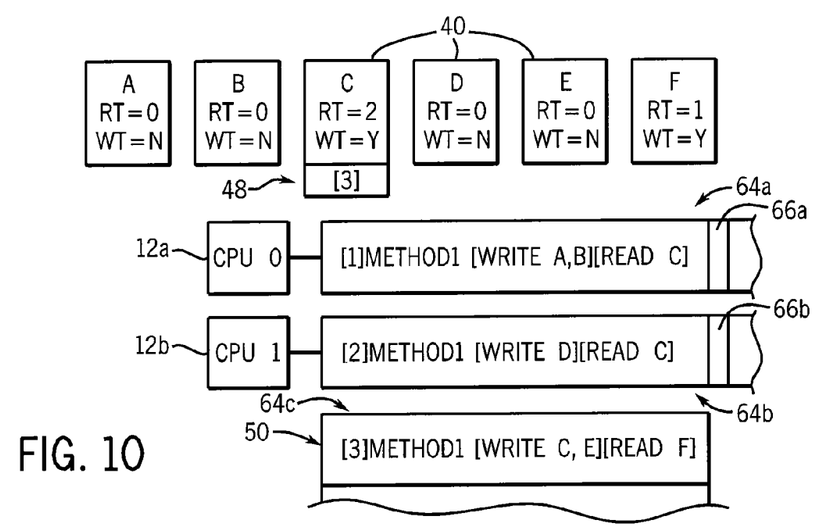
FIG. 10 is figure similar to that of FIGS. 7, 8, and 9 showing a "shelving" of the third computational operation and enrolling it in a wait list of data objects associated with a token it must acquire.

Referring still to FIG. 9, the data object mapper 36 for a third computational operation [3]method1[write: C, E] [read: F] is then executed. As shown in FIG. 10, one write token (that for the E data object 40) and the read token (for the F data object 40) can be obtained, but the write token for the C data object 40 cannot be obtained because of the pendency of the proxy operations 64a and 64b in processor queue 26a and 26b, which read object C. For this reason, the proxy operation 64c for this third computational operation 32 is placed on shelf 50 and identification of the computational operation (e.g. [3]) is placed in the wait lists 48 of the C data object 40.

Figure 11:
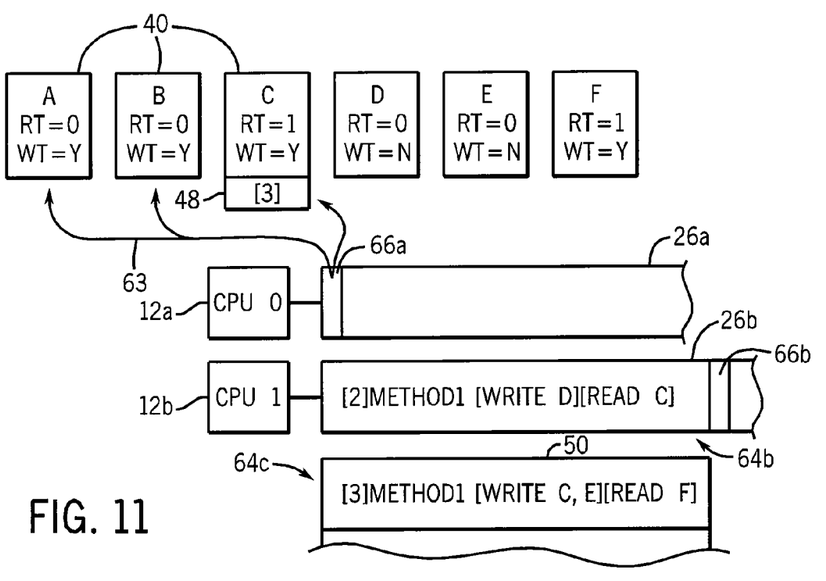
FIG. 11 is a figure similar to that of FIGS. 7, 8, 9, and 10, showing subsequent completion of the first computational operation causing the data dependency with the third computational operation.

Referring now to FIG. 11, at a later time the proxy operation 64a of [1]method1[write: A,B] [read: C] in processor queue 26a may be completed by processor 12a. The executed addendum operation 66a associated with this proxy operation 64a then executes to return the tokens required for the execution of the computational operation 32, per arrow 63, so that the write tokens for the data objects 40 of A and B are returned (returning them to WT=Y as shown) and the read token for data object C is returned decrementing the read token counter 44 to RT=1.

Although the proxy operation 64a in processor queue 26a is complete and the write token is now available for the C data object 40, per the rules described above, the write token for the C data object 40 cannot be granted to operations that require it (e.g. [3]method1 waiting on shelf 50) because there is an outstanding read token (RT=1). The unavailability of this token may be determined by the addendum operation 66a for [1]method1 [write: A, B] [read: C] at the time the tokens are returned. For this reason, the addendum operation 66a does not move the proxy operation 64c of [3] method1[write: C, E] [read: F] from the shelf 50.

Figure 12:
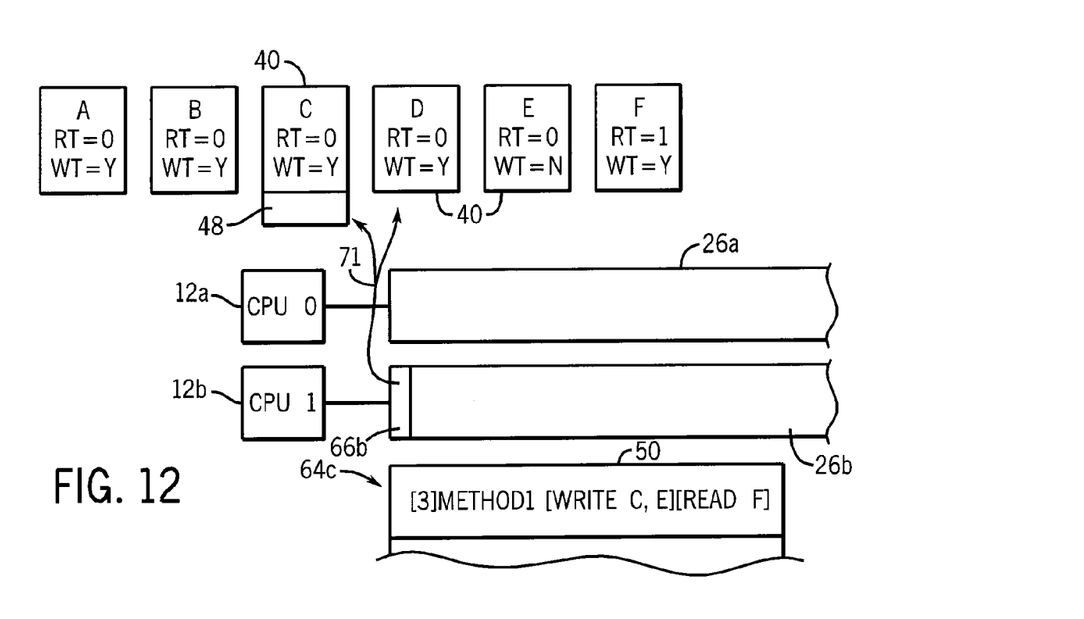
FIG. 12 is a figure similar to that of FIGS. 7, 8, 9, 10, and 11 showing a return of the tokens, by the second computational operation, necessary for the execution of the shelved third computational operation.

Referring now to FIG. 12, at some subsequent time the proxy operation 64b [2]method1 [write: D] [read: C] held in processor queue 26b is complete and the addendum operation 66b for this proxy operation 64b returns the tokens as indicated by arrows 71. At this time, the addendum operation 66b examines the wait list 48 of the C data object 40 to which it is returning a token and all other wait lists for the topmost computational proxy operation 64c in that wait list 48 to determine if the return of the token to the C data object 40 completes the necessary tokens for the top listed computational proxy operation 64c in the wait list 48. In this case it does and so, with the return of the read token for data object C, the addendum operation 66b unshelves the proxy operations 64 of [3] method1 [write: C, E] [read: F] obtaining its final token and moving the proxy operations 64c to any available queue (in this case processor queue 26a as shown in FIG. 13).

Figure 13:
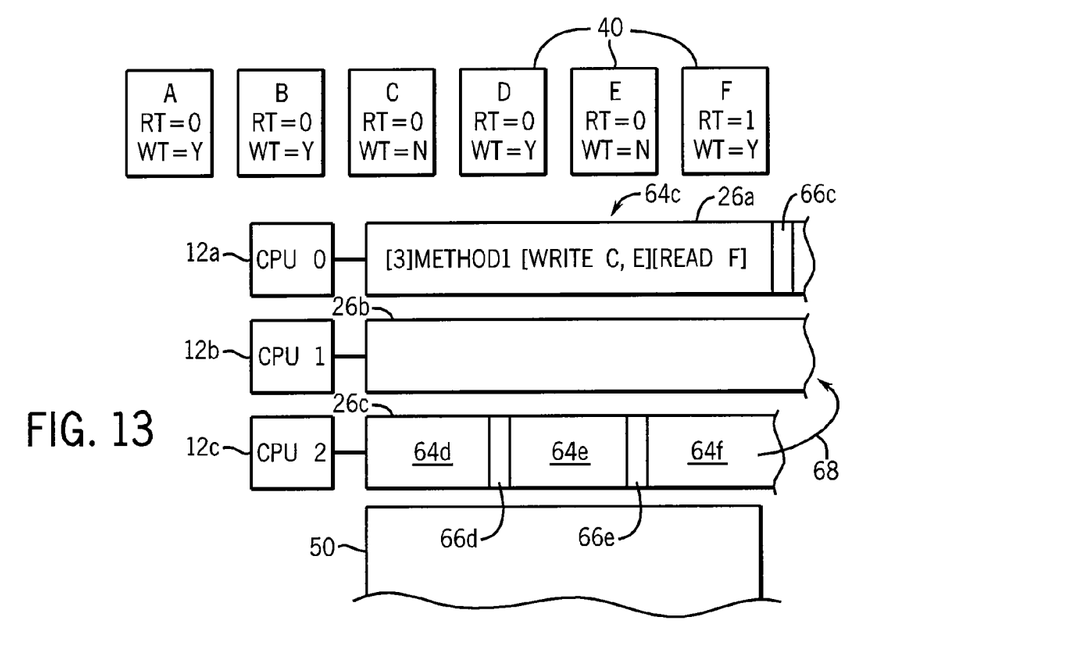
FIG. 13 is a figure similar to that of FIGS. 7, 8, 9, 10, 11 and 12 showing a unshelving of the third computational operation and work stealing by free processors

Referring still to FIG. 13, the computational operation 32 of [3]method1 [write: C, E] [read: F] may then be executed by processor 12a. At all times, any processor 12 that does not have queued proxy operations 64 may "steal" work from any other processor queue 26, for example as indicated by arrow 68. This efficiency-enhancing feature is possible because the queues 26 are not used to create an ordering of the computational operations 32 but this function is accomplished by the tokens and the wait list 48. Each of the computational operations 32 are thus executed in an order that prevents data dependency problems while still permitting free load-sharing among the processors 12.

Generally, if the top listed computational proxy operation in a wait list 48 is waiting for a write token, then that will be the only computational proxy operation that will be processed when the write token is returned as described above. But if the top listed computational proxy operation in a wait list is waiting for a read token, then all subsequent computational proxy operations in the wait list 48 also waiting for read tokens may also be processed, up to the first intervening computational proxy operation in the wait list 48 that is waiting for a write token. In general, then, multiple read token requests can be granted at one time, but only one write request can be granted at one time.

Figure 14:
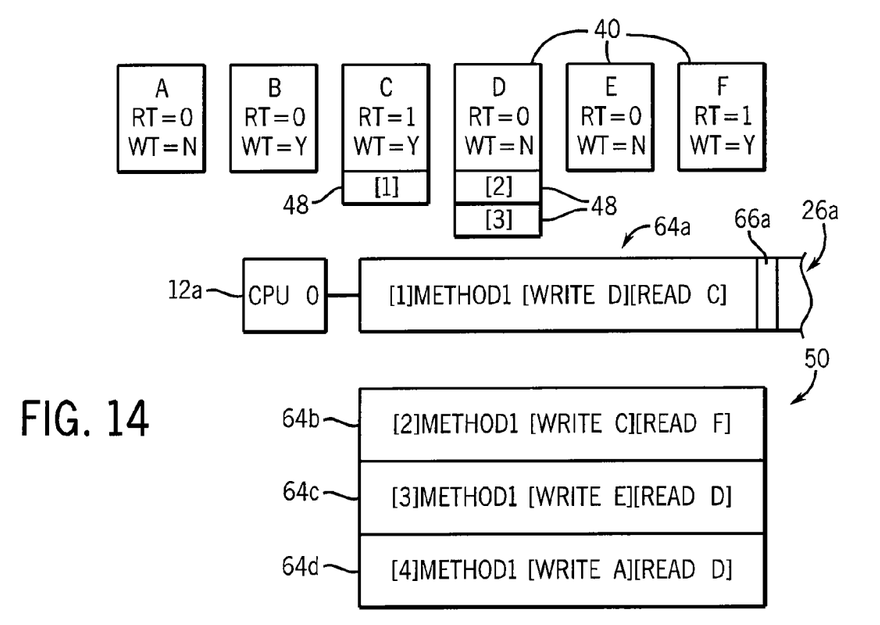
FIG. 14 is a figure similar to that of FIG. 7 showing a state of data objects when one pending computational operation has obtained a read token and a write token blocking three other computational operations two of which require read tokens.

For example, referring now to FIG. 14, a proxy operation 64a of the form [1]method1 [write: D] [read: C] may be queued for execution in processor queue 26a having obtained the write token from the D data object 40 and the read token from the C data object 40.

This queued proxy operation 64a may block three subsequent proxy operations 64b, 64c, and 64d which causes them to be placed on shelf 50.

Proxy operation 64b may be of the form [2]method1 [write: C] [read: F] and is blocked by its inability to obtain the write token from the C data object 40 (because a read token has been taken). This proxy operation 64b may nevertheless obtain a read token from the F data object 40 and does so.

Proxy operation 64c may be of the form [3]method1 [write: E] [read: D] and is blocked by its inability to obtain the read token from the D data object 40 (because the write token is missing). Proxy operation 64c is accordingly enrolled in the waiting list 48 of the D data object 40 for a read token. This proxy operation 64c may nevertheless obtain a write token from the E data object 40.

Proxy operation 64d may in turn be of the form [4]method1 [write: A] [read: D] and is also blocked by its inability to obtain a read token from the D data object 40. Proxy operation 64d is accordingly enrolled in the waiting list 48 of the D data object 40 for a read token right after proxy operation 64c. The proxy operations 64d may nevertheless obtain the necessary write token from the A data objects 40.

Figure 15:
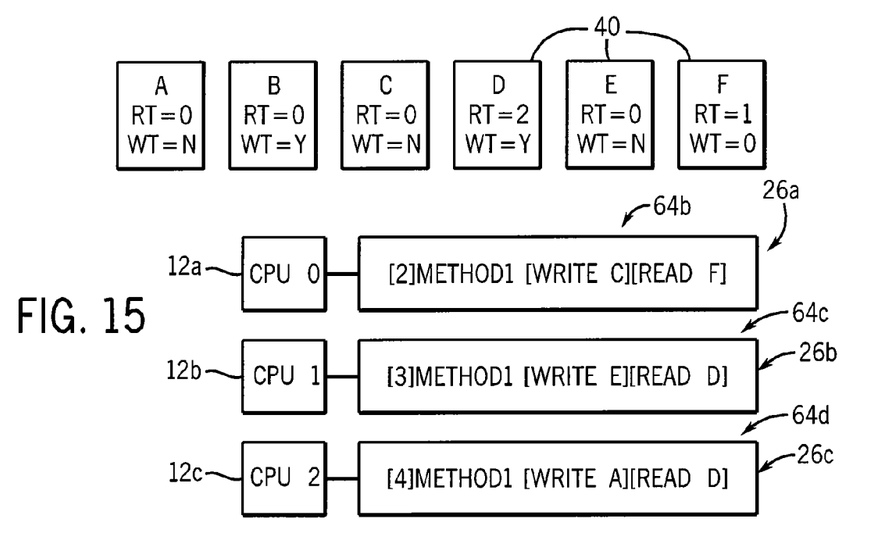
FIG. 15 is a figure similar to that FIG. 14 showing the simultaneous release of multiple computational operations requiring read tokens.

When the proxy operation 64a is complete, as shown in FIG. 15, it releases the read token for the C data object 40 allowing proxy operation 64b to obtain the necessary write token from the C data object 40 and thus to be enrolled in the processor queue 26a according to the procedures described above.

In addition, proxy operation 64a releases the write token from the D data object 40. This allows all pending read token requests in the wait list 48 (in this case being for proxy operation 64c and proxy operation 64d) to be simultaneously released allowing both of these proxy operations to now be enrolled, for example, with proxy operation 64c enrolled in processor queue 26b and proxy operation 64d enrolled in processor queue 26c. Generally, all pending requests for read tokens in a wait list 48 may be released until a request for a write token is reached in the wait list 48 (not shown in the present example).

It will be understood that there is a wide variety of different ways in which the tokens can be implemented including, for example, actual communication of token data, the use of shared variables or counters, tables showing token ownership and the like.

It should be understood that the processor queues 26 can be polymorphic, meaning that they can hold computational operations as well as other segments of the main program. As computational operations are encountered, the remainder of the main program may be put in a processor queue 26 while the computational operation is first executed. This remainder of the main program can be stolen by another processor that is free. Thus, the processor queue can end up holding different types of "work" which require different handling capabilities.

When introducing elements or features of the present disclosure and the exemplary embodiments, the articles "a", "an", "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a multi-processor should be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A method of executing computational operations of a program in parallel on multiple processors, the method comprising the steps of:
   (a) identifying in the program the computational operations accessing sets of data elements, each of the sets of data elements having a write token and a plurality of read tokens; wherein the write token of a given data element is available only when no read tokens from the given data element are currently taken by other computational operations, and the read tokens for each data element are represented by a tally that may be increased and decreased to indicate a taking or return of the read tokens, a read token from the given data element is only available if the write token of the given data element is not currently taken by other computational operations;

(b) establishing a serial execution order of the computational operations by following dynamically determined loops, jumps and branches between computational operations of the program;

(c) contemporaneously with execution of each given computational operation needing to write to a given data element of the sets of data elements:
  (i) determining whether the write token is available for the given data element;
  (ii) when the write token is available for the given data element and there are no other computational operations earlier than the data element in the serial execution order, taking the write token by the given computational operation and permitting completion of the execution of the given computational operation with respect to the writing of the given data element;
  (iii) when the write token is not available for the given data element, wait for the write token for the given data element;

(d) upon the completion of execution of the given computational operation, returning the write token;

(e) contemporaneously with execution of each given computational operation reading a given data element;
  (i) taking a read token and, if not otherwise blocked, permitting completion of the execution of the given computational operation with respect to reading the given data element, and
  (ii) upon the completion the given computational operation, returning the read token;

(f) while a given computational operation has taken and not returned a write token associated with a given data element, blocking other computational operations associated with the given data element that are waiting for a read token and that are after the given computational operation in the serial execution order; and (g) after the given computational operation has returned the write token associated with the given data element, cease blocking all other computational operations associated with the given data element that waiting for a read token and after the given computational operation in the serial execution order up to a first other computational operation in the serial execution order waiting for a write token, and (h) wherein processors of the multiple processors are associated with at least one processor queue and wherein the given computational operation is placed in the processor queue to be executed by a processor only after it is permitted to execute and all necessary write tokens are taken by the given computational operation.

2. The method of claim 1 further including the steps of enrolling a given computational operation in a wait list associated with the given data element when a read token is not available because the write token associated with the given data element is taken and releasing the given computational operation from the wait list for execution when the read token associated with the given data element becomes available.

3. The method of claim 2 further including the step of making the write token available to a later computational operation in the wait list.

4. The method of claim 1 wherein processors of the multiple processors are each associated with a separate processor queue and wherein the processors may take computational operations from the associated processor queue of another processor when the processors are not executing computational operations.

5. The method of claim 1 wherein step (c) is provided by instructions embedded in the program.

6. The method of claim 1 wherein step (c) is provided by instructions attached to the computational operation needing to write to the given data element.

7. The method of claim 1 wherein the read and write tokens are realized by change of a variable value.

8. A computer system comprising:
multiple processors executing a parallelizing program stored in non-transitory medium to:
parallelize a target program on the multiple processors to execute computational operations of the target program in parallel on the multiple processors by:

(a) identifying in the program the computational operations accessing sets of data elements, each of the sets of data elements having a write token and a plurality of read tokens; wherein the write token of a given data element is available only when no read tokens from the given data element are currently taken by other computational operations, and the read tokens for each data element are represented by a tally that may be increased and decreased to indicate a taking or return of the read tokens, a read token from the given data element is only available if the write token of the given data element is not currently taken by other computational operations;

(b) establishing a serial execution order of the computational operations by following dynamically determined loops, jumps and branches between computational operations of the program;

(c) contemporaneously with execution of each given computational operation needing to write to a given data element of the sets of data elements:
  (i) determining whether the write token is available for the given data element;
  (ii) when the write token is available for the given data element and there are no other computational operations earlier than the data element in the serial execution order, taking the write token by the given computational operation and permitting completion of the execution of the given computational operation with respect to the writing of the given data element;
  (iii) when the write token is not available for the given data element, wait for the write token for the given data element;

(d) upon the completion of execution of the given computational operation, returning the write token;

(e) contemporaneously with execution of each given computational operation reading a given data element;
  (i) taking a read token and, if not otherwise blocked, permitting completion of the execution of the given computational operation with respect to reading the given data element, and
  (ii) upon the completion the given computational operation, returning the read token;

(f) while a given computational operation has taken and not returned a write token associated with a given data element, blocking other computational operations associated with the given data element that are waiting for a read token and that are after the given computational operation in the serial execution order; and (g) after the given computational operation has returned the write token associated with the given data element, cease blocking all other computational operations associated with the given data element that waiting for a read token and after the given computational operation in the serial execution order up to a first other computational operation in the serial execution order waiting for a write token, and (h) wherein processors of the multiple processors are associated with at least one processor queue and wherein the given computational operation is laced in the processor queue to be executed by a processor only after it is permitted to execute and all necessary write tokens are taken by the given computational operation.

9. The computer system of claim 8 wherein the parallelizing program further enrolls a given computational operation in a wait list associated with the given data element when a read token is not available because The write token associated with the given data element is taken and release the given computational operation from the wait list for execution when the read token associated with the given data element becomes available;

wherein the parallelizing program further executes to make the write token available to a later computational operation in the wait list.

10. The computer system of claim 8 wherein processors of the multiple processors are each associated with a separate processor queue and wherein a given processor may take computational operations from a processor queue of another processor when the given processor is not executing computational operations.

* * * * *